United States Patent
Shalom et al.

(10) Patent No.: US 11,861,211 B2
(45) Date of Patent: Jan. 2, 2024

(54) SYSTEM WHICH PROVIDES PLURAL PROCESSES IN A HOST WITH ASYNCHRONOUS ACCESS TO PLURAL PORTIONS OF THE MEMORY OF ANOTHER HOST

(71) Applicant: MELLANOX TECHNOLOGIES, LTD., Yokneam (IL)

(72) Inventors: Gal Shalom, Givat Avni (IL); Adi Horowitz, Tel Aviv (IL); Omri Kahalon, Yehud (IL); Liran Liss, Atzmon (IL); Aviad Yehezkel, Yoqneam Illit (IL); Rabie Loulou, Nazareth (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 2 days.

(21) Appl. No.: 17/543,334

(22) Filed: Dec. 6, 2021

(65) Prior Publication Data
US 2023/0176769 A1 Jun. 8, 2023

(51) Int. Cl.
*G06F 3/06* (2006.01)
*G06F 9/54* (2006.01)

(52) U.S. Cl.
CPC .......... *G06F 3/0655* (2013.01); *G06F 3/061* (2013.01); *G06F 3/0673* (2013.01); *G06F 9/544* (2013.01)

(58) Field of Classification Search
CPC ...... G06F 3/0655; G06F 3/061; G06F 3/0673; G06F 9/544
See application file for complete search history.

(56) References Cited

U.S. PATENT DOCUMENTS

| 2016/0011915 A1* | 1/2016 | Dice | G06F 9/466 718/102 |
| 2021/0271420 A1* | 9/2021 | Lin | G06F 3/0656 |
| 2021/0342188 A1* | 11/2021 | Novakovic | H04L 63/10 |

FOREIGN PATENT DOCUMENTS

WO WO-2019202037 A1 * 10/2019 ......... G06F 12/1441

OTHER PUBLICATIONS

"Asynchronous I/O," Wikipedia, edited Oct. 1, 2021, 9 pages [retrieved online May 9, 2022 from: en.wikipedia.org/w/index.php?title=Asynchronous_I/O&oldid=1047531314].
(Continued)

*Primary Examiner* — Zhuo H Li
(74) *Attorney, Agent, or Firm* — Sheridan Ross P.C.

(57) ABSTRACT

API in conjunction with a bridge chip and first and second hosts having first and second memories respectively. The bridge chip connects the memories. The API comprises key identifier registration functionality to register a key identifier for each of plural computer processes performed by the first host, thereby to define plural key identifiers; and/or access control functionality to provide at least computer process P1 performed by the first host with access, typically via the bridge chip, to at least local memory buffer M2 residing in the second memory, typically after the access control functionality first validates that process P1 has a key identifier which has been registered, e.g., via the key identifier registration functionality. Typically, the access control functionality also prevents at least computer process P2, performed by the first host, which has not registered a key identifier, from accessing local memory buffer M2, e.g., via the bridge chip.

22 Claims, 3 Drawing Sheets

(56) References Cited

OTHER PUBLICATIONS

"Multi-host," NVIDIA Corporation, 2022, 3 pages [retrieved online May 9, 2022 from: docs.nvidia.com/networking/display/BlueFieldSWv31011424/Multi-host].

"Multi-Host System and Intelligent I/O Design with PCI Express," PLX Technology, Inc., 2004, 4 pages [retrieved online May 9, 2022 from: docs.broadcom.com/doc/12353427].

"Transparent Bridging," eTutorials.org, © 2008-2021, 5 pages [retrieved online May 9, 2022 from: etutorials.org/Networking/Lan+switching+fundamentals/Chapter+1.+LAN+Switching+Foundation+Technologies/Transparent+Bridging/].

Barak "ibv_reg_mr()," RDMAojo, Sep. 7, 2012, 35 pages [retrieved online May 9, 2022 from: www.rdmamojo.com/2012/09/07/ibv_reg_mr/].

Braun et al. "Tool Options When Debugging an FPGA-Based ECU for Autonomous Driving," MLE, Apr. 24, 2019, 24 pages [retrieved online May 9, 2022 from: missinglinkelectronics.com/devzone/].

Regula "Using Non-transparent Bridging in PCI Express Systems," PLX Technology, Inc., 2004, 31 pages.

* cited by examiner

SYSTEM WHICH PROVIDES PLURAL PROCESSES IN A HOST WITH ASYNCHRONOUS ACCESS TO PLURAL PORTIONS OF THE MEMORY OF ANOTHER HOST

FIELD

This invention relates generally to bridge chips, and more specifically to Non-Transparent Bridges (NTBs).

BACKGROUND

Transparent bridging is described in the following online link: etutorials.org/Networking/Lan+switching+fundamentals/Chapter+1.+LAN+Switching+Foundation+Technologies/Transparent+Bridging/.

Missinglinkelectronics.com explains (in this link: missinglinkelectronics.com/devzone/index.php/fpga-debug-ntb), using RC to stand for "root complex", that:

"NTB stands for Non-Transparent Bridge. Unlike in a PCI-Express aka PCIe (transparent) Bridge where the RC "sees" all the PCIe busses all the way to all the Endpoints, an NTB forwards the PCIe traffic between the separate PCIe busses like a bridge. Each RC sees the NTB as an Endpoint device but does not see the other RC and devices on the other side. Means, everything behind the NTB is not directly visible to the particular RC, thus "Non-Transparent"."

Eetimes.com describes (in the following online link: eetimes.com/non-transparent-bridging-makes-pci-express-ha-friendly/#) that "A non-transparent bridge is functionally similar to a transparent bridge, with the exception that there is an intelligent device or processor on both sides of the bridge, each with its own independent address domain. The host on one side of the bridge will not have the visibility of the complete memory or I/O space on the other side of the bridge."

"Mellanox Multi-Host technology enables connecting a number of compute/storage hosts to a single ConnectX® network adapter" e.g., as described in this online link: docs.mellanox.com/display/BlueFieldSWv31011424/Multi-host.

Broadband.com describes (in the following online publication: docs.broadcom.com/doc/12353427) that "Developers have been using non-transparent bridging . . . for years to design multi-host systems and intelligent I/Os . . . . The non-transparent bridging (NTB) function enables isolation of two hosts or memory domains yet allows status and data exchange between the two hosts or sub-systems."

An example of non-transparent bridges (NTBs) being used to share memory between 2 hosts is provided in the following online publication: kernel.org/doc/html/latest/driver-api/ntb.html and includes the following operations:
"Local Device:
  1. Allocate memory for a shared window
  2. Initialize memory window by translated address of the allocated region (it may fail if local memory window initialization is unsupported)
  3. Send the translated address and memory window index to a peer device
Peer Device:
  1. Initialize memory window with retrieved address of the allocated by another device memory region (it may fail if peer memory window initialization is unsupported)
  2. Map outbound memory window".

The online publication at the following link: docs.broadcom.com/doc/12353428#:~:text=A%20transparent%20bridge%20does%20not,opposite%20(other%20side)%20interface provides a detailed technical comparison between transparent and non-transparent bridges. It is appreciated that non-transparent bridges need not have each and every technical feature referred to in this publication.

Asynchronous I/O is described in the following online publication: en.wikipedia.org/wiki/Asynchronous_I/O.

SUMMARY OF THE DISCLOSURE

Certain embodiments seek to provide an asynchronous and/or non-privileged NTB control and an input-output Application Programming Interface (IO API). Typically, the IO API provides IO (input-output) between hosts which may be interconnected by an NTB and also provides NTB control of a-synchronous read and write transactions between the hosts, or of the IO. Typically, a given process (which may be running on one of the hosts) need not arrest its processing until the transaction has been completed; instead, typically, the process may continue its processing even though the transaction has not yet completed.

Certain embodiments seek to provide non-privileged Non-Transparent Bridge control and/or non-privileged Non-Transparent Bridge IO, which is typically non-privileged in the sense that the control and/or IO may be performed by a (typically any) non-privileged process rather than only by processes which are privileged.

At least the following embodiments are provided:

Embodiment 1. API (application programming interface) apparatus operative in conjunction with a bridge chip, a first host and a second host, wherein the first and second hosts have first and second memories respectively, and wherein the bridge chip connects the first and second memories, the apparatus comprising: key identifier registration functionality to register a key identifier for each of plural computer processes performed by the first host, thereby to define plural key identifiers; and/or access control functionality to provide at least one computer process P1 performed by the first host with access, typically via the bridge chip, to at least one local memory buffer M2 residing in the second memory, typically after the access control functionality first validates that the computer process P1 has a key identifier which has been registered, e.g., via the key identifier registration functionality, and wherein, typically, the access control functionality also prevents at least one computer process P2, which is performed by the first host and/or which has not registered a key identifier via the key identifier registration functionality, from accessing the local memory buffer M2, e.g., via the bridge chip.

Embodiment 2. Apparatus according to any of the embodiments described herein wherein the first host, which has a local memory buffer M1, registers the local memory buffer in the bridge chip and, responsively, receives a key identifier from the bridge chip.

Embodiment 3. Apparatus according to any of the embodiments described herein wherein the second host registers the local memory buffer M2 in the bridge chip and, responsively, receives a key identifier from the bridge chip.

Embodiment 4. Apparatus according to any of the embodiments described herein wherein at least one command to perform a read transaction is issued by the first host and wherein the command comprises a target address and a local address where the bridge chip writes a read response which is required at the target address.

Embodiment 5. Apparatus according to any of the embodiments described herein wherein at least one command to perform a write transaction is issued by the first host and wherein the command comprises a target address and a local address from which the bridge chip takes write data.

Embodiment 6. Apparatus according to any of the embodiments described herein wherein the command also comprises a transaction size parameter indicative of an amount of data to be read.

Embodiment 7. Apparatus according to any of the embodiments described herein wherein the command also comprises a transaction size parameter indicative of an amount of data to be written.

Embodiment 8. Apparatus according to any of the embodiments described herein wherein the bridge chip receives the command via the API and, responsively, makes a validation attempt including attempting to validate that the command has a valid key from the first host (aka valid local key) and a valid key from the second host (aka valid remote key) and wherein the read transaction is performed only after the bridge chip succeeds in the validation attempt.

Embodiment 9. Apparatus according to any of the embodiments described herein wherein the bridge chip receives the command via the API and, responsively, makes a validation attempt including attempting to validate that the command has a valid key from the first host (aka valid local key) and a valid key from the second host (aka valid remote key) and wherein the write transaction is performed only after the bridge chip succeeds in the validation attempt.

Embodiment 10. Apparatus according to any of the embodiments described herein and wherein, to indicate that the read transaction has been performed, a command counter is incremented.

Embodiment 11. Apparatus according to any of the embodiments described herein and wherein, to indicate that the write transaction has been performed, a command counter is incremented.

Embodiment 12. Apparatus according to any of the embodiments described herein and wherein the bridge chip comprises a Non-Transparent Bridge (NTB) which connects plural memories residing on plural computers respectively, to a single PCI-Express fabric.

Embodiment 13. Apparatus according to any of the embodiments described herein wherein the second host includes a smart NIC.

Embodiment 14. Apparatus according to any of the embodiments described herein wherein the second host comprises a DPU.

Embodiment 15. Apparatus according to any of the embodiments described herein and wherein an error message is generated each time the bridge chip determines that the first host does not have a key identifier registered via the key identifier registration functionality.

Embodiment 16. Apparatus according to any of the embodiments described herein which provides an interface to the bridge chip and provides memory isolation between at least one computer process A performed by a first host and the at least one local memory buffer M2.

Embodiment 17. Apparatus according to any of the embodiments described herein and wherein the API apparatus also comprises:
  an additional key identifier registration functionality and
  an additional access control functionality, which provides
    at least one computer process P3 performed by the second host with access via the bridge chip to at least one local memory buffer M1 residing in the first memory, after the additional access control functionality first validates that the computer process P3 has a key identifier which has been registered via the additional key identifier registration functionality,
  and wherein the additional access control functionality also prevents at least one computer process P4, which is performed by the second host and which has not registered a key identifier via the additional key identifier registration functionality, from accessing the local memory buffer M1 via the bridge chip.

Embodiment 18. Apparatus according to any of the embodiments described herein wherein the API (Application Programming Interface) apparatus includes the bridge chip, the first host, and the second host.

Embodiment 19. Apparatus according to any of the embodiments described herein and wherein a completion bit is provided, to indicate that the read transaction has been performed.

Embodiment 20. Apparatus according to any of the embodiments described herein and wherein a completion bit is provided, to indicate that the write transaction has been performed.

Embodiment 21. An application programming interfacing method operative in conjunction with a bridge chip, a first host and a second host, wherein the first and second hosts have first and second memories respectively, and wherein the bridge chip connects the first and second memories, the method comprising:
  registering a key identifier for each of plural computer processes performed by the first host, thereby to define plural key identifiers; and
  providing at least one computer process P1 performed by the first host with access via the bridge chip to at least one local memory buffer M2 residing in the second memory, after first validating that the computer process P1 has a key identifier which has been registered, and
  preventing at least one computer process P2, which is performed by the first host and which has not registered a key identifier, from accessing the local memory buffer M2 via the bridge chip.

Embodiment 22. Apparatus according to any of the embodiments described herein wherein the key identifier identifies the local memory buffer M2.

Embodiment 23. Apparatus according to any of the embodiments described herein wherein the key identifier uniquely identifies the local memory buffer M2.

DETAILED DESCRIPTION OF CERTAIN EMBODIMENTS

Multi-host technology, which is known, allows multiple compute or storage hosts to connect into a single interconnect adapter, for example by separating an adapter (PCIe, for example) bus into several independent interfaces. For example, Mellanox Multi-Host™ technology, first introduced with ConnectX®-4, is enabled in the Mellanox Socket Direct card. This technology allows plural hosts to be connected into a single adapter by separating the PCIe (for example) interface into plural independent interfaces. As described for example in the following https www link: nvidia.com/en-us/networking/multi-host/, each interface typically connects to a separate host CPU. Typically, in multi-host architectures, multiple hosts connect directly to a single network controller, yielding direct access to data with low capital and operating expenses. The multi-host architecture may include different CPU architectures (e.g., x86 and/or Power and/or ARM central processing units) where each host is independent of the others, yet all hosts may share the same network interface which conserves switch ports, cables, real estate and power.

A PCI (peripheral component interconnect) or PCIe device, when addressed, is typically enabled e.g., by being mapped into a system's I/O port address space or memory-mapped address space. The system's firmware, device drivers, or the operating system may program so-called "Base Address" Registers (aka BARs) to inform the device of the PCIe device's address mapping e.g., by writing configuration commands to the PCIe controller.

InfiniBand (IB) is a computer networking communications standard, used for data interconnect among and/or within computers e.g., supercomputers and/or as a direct or switched interconnect either between servers and storage systems, or among storage systems.

Published InfiniBand specifications are available from the InfiniBand trade association. InfiniBand provides remote direct memory access (RDMA) capabilities for low CPU overhead. InfiniBand uses a switched fabric network topology aka switching fabric in which, typically, nodes interconnect via more network switches, such as crossbar switches. Mellanox's InfiniBand host bus adapters and network switches, for example, are used in many commercially available computer systems and databases.

The following terms may be construed either in accordance with any appropriate definition thereof appearing in literature in the relevant field of technology, or in accordance with the specification, or to include in their respective scopes, the following:

The term "Fabric" is intended to include, by way of non-limiting example, the fabric illustrated at the following https link: etherealmind.com/wp-content/uploads/2011/07/what-switch-fabric-pt2-6.jpg/.

The term "privilege" refers to an individual attribute (e.g., of a computer process) that allows a "privileged" process to perform a security-related operation (such as a memory access operation e.g., access of a DPU to host memory from the ARM side) and does not allow other ("non-privileged") processes to perform the same operation. A process that is running with a privilege or privileges is called a privileged process and the program that the process is running is called a privileged or trusted program. A privileged computer process is authorized and/or trusted, to perform at least one given security-relevant function that other, ("non-privileged") processes are not trusted to perform, hence are not authorized to perform.

Host: a networked computer, such as, by way of non-limiting example, a DPU.

The terms "compute host" and "storage host" are defined in the following https www online location: nvidia.com/en-us/networking/multi-host/.

A "key identifier" is an identifier e.g., a number or other string which identifies (is associated, typically uniquely, with) a given memory region and serves as a key (e.g., the key identifier must be given to the hardware in order to access the given memory region).

"Memory isolation" occurs when a process A cannot access process B's memory (e.g., cannot access any memory which is associated with any process other than process A itself), except when process A is given the privilege to access, or is granted explicit permission to access, to memory associated with some process other than process A itself. For example, "logical" memory isolation may be achieved by an NTB which provides processor domain partitioning and address translation between memory-mapped spaces of processor domains, such that devices on each side of the bridge are not visible from the other side, and, nonetheless, data transfer and status exchange between the processor domains is possible.

The term "process" is intended to include, e.g., as described in this link: en.wikipedia.org/wiki/Process_(computing), an instance of a computer program that is being executed by one or many threads. The process typically contains program code and its activity. Depending on the operating system (OS), a process may include plural threads of execution, all executing instructions concurrently.

Bridge chip: a device that connects one bus (e.g., PCIe bus), on which there may be a first host, to another (e.g., PCIe) bus, on which there may be a second host. A bridge chip may have on-board read and write queues, may have prefetching functionality, and may have caching functionality, either or both of which may be configurable by a user.

Local/remote: given a computer process performed by a first host, which seeks access, via a bridge chip, to at least one local memory buffer residing on a second host, a "local" key is a key from the first host, whereas a "remote" key is a key from the second host.

Read operation: includes reading data from remote host memory, and writing that data to a local host's memory.

Write operation: includes reading data from the local host memory, and writing that data to the remote host's memory.

"Offset" of a host is a term which defines where a memory transaction starts in a given memory area or region pointed to by a given key. For example, especially when the memory area comprises a very large memory region, the offset (e.g., from the start of the region) and a length parameter may be used to define a sub region (within the given area) that a given transaction is to act on.

Register: intended to include storage, e.g., for a key identifier; if this occurs in accordance with the PCIe specification, each register comprises a valid address on the device address space range or config space, from which a host may read and/or from which a host may write.

An NTB (Non-Transparent Bridge) is a bridge chip which (e.g., as described in the following online https www link: kernel.org/doc/html/latest/driver-api/ntb.html), connects plural memory systems or memories residing on plural computers respectively, to a single fabric (e.g., to a PCI-Express (aka PCIe) fabric in which case the NTB may be termed a PCIe NTB chip). NTB hardware may support read-and-writable registers that are accessible from both sides of the device, which allows peers to exchange a certain amount of data at a fixed address. NTB client drivers register with the NTB core driver; registration may use the Linux Device framework, for example. NTB is useful when it is desired to share some memory between plural systems which are deployed on the 2 "sides" of the bridge respectively. Typically, the NTB has an API which supports two types of memory window interfaces—inbound translation and outbound translation. The former is typically configured on a local NTB port, and the latter (outbound translation) is typically configured by the peer or remote side of the bridge, on the peer NTB port.

It may be useful, for a user of a multi-host environment, and specifically in an environment which includes a Smart-NIC or a DPU, to offload some of the processing and computation to the DPU host itself (e.g., ARM cores on Bluefield®2). However, those offloaded processes may need access to data which resides on the main host itself (e.g., the x86). The problem to be addressed is how multiple processes in the DPU host access asynchronously to different part of the memory of the main host with varying granularity or different granularities, while giving each process different permission access, and ensuring that memory isolation (e.g., as defined above) is provided between the various processes. It is appreciated that if plural processes are to be downloaded to a DPU host, each such process may need access to the host memory.

Possible solutions to the problem of how to support asynchronous access of multiple processes in a host, to various portions of a main host's memory having various granularities, include:

1. Legacy NTB—conventional APIs of conventional NTBs may include fixed mapping of the host memory to the NTB address space. Here, accessing different portions or regions of memory typically involves reconfiguring the window each time—which can only be done by a privileged process. Moreover, according to the PCIe specification, reconfiguring the window typically cannot be done asynchronously. If it is desired or needed to support accessing to different address spaces, a window for each address space may be required—which would likely translate to an unattainable size of BAR.

2. RDMA—using RDMA read and RDMA write, one can overcome the problem. However, this solution requires an RDMA capable device and opening multiple connections between each offloaded process to the host. It is appreciated that when an RDMA capable device opens plural connections between plural offloaded processes and a host, this undesirably consumes network resources.

3. A client-server model of an RPC (remote procedure call) may be used. This involves the DPU host having a client daemon to send transactions to read/write a memory on the main host and having an exposed API to the other process. The main host itself may have a server daemon to accept those transactions, execute them, and send a response, if and as needed. This solution requires additional utilization of the CPU—for both the DPU host and the main host. Moreover, this solution has high latency overall, and the required software is complex.

Figure 1:
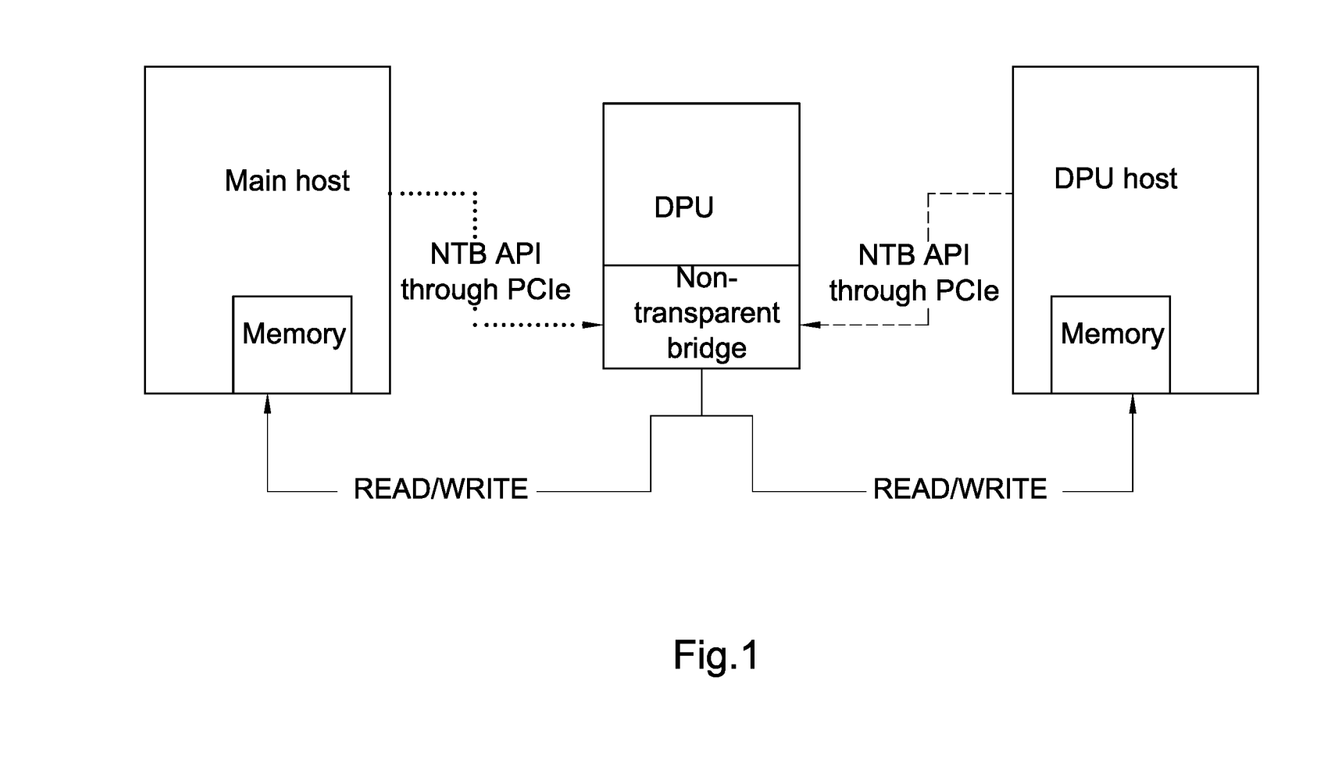
FIG. 1 is a simplified block diagram of a system for non-privileged Non-Transparent Bridge control and IO which is constructed and operative in accordance with an embodiment of the invention.

However, in contrast, certain embodiments of the invention include an NTB device API or IO API e.g., as shown in FIG. 1 which, typically, asynchronously supports both read and write, typically provides memory isolation, and typically provides privileges for memory access.

Generally, the term "asynchronous" is used to differentiate from "synchronous" operation of a system in which tasks or IO operations or transactions are performed one at a time, and only when one is completed, the next task is unblocked such that it is necessary to wait for a task to finish before moving to the next task. In asynchronous operations, a next task can begin before a previous task finishes. Thus, with asynchronous programming, multiple requests may be dealt with simultaneously, enabling many more tasks to be completed in a given period of time, thereby to facilitate parallelism. For example, a conventional computer process typically needs to wait to get memory, since a conventional or legacy NTB typically uses conventional PCIe transactions which generate a response only after a certain time has elapsed; this is not the case for the embodiments herein which are asynchronous.

A-synchronicity of tasks e.g., of NTB IO operations (e.g., read and write transactions between two hosts which may be interconnected by an NTB) and asynchronous I/O are defined in the following on-line entry: en.wikipedia.org/wiki/Asynchronous_I/O.

Thus, FIG. 1 illustrates an API (Application Programming Interface) apparatus, which is operative in conjunction with a bridge chip, a first host, and a second host, and which provides plural processes in a host with asynchronous access to plural portions of the memory of another host.

Figure 2:
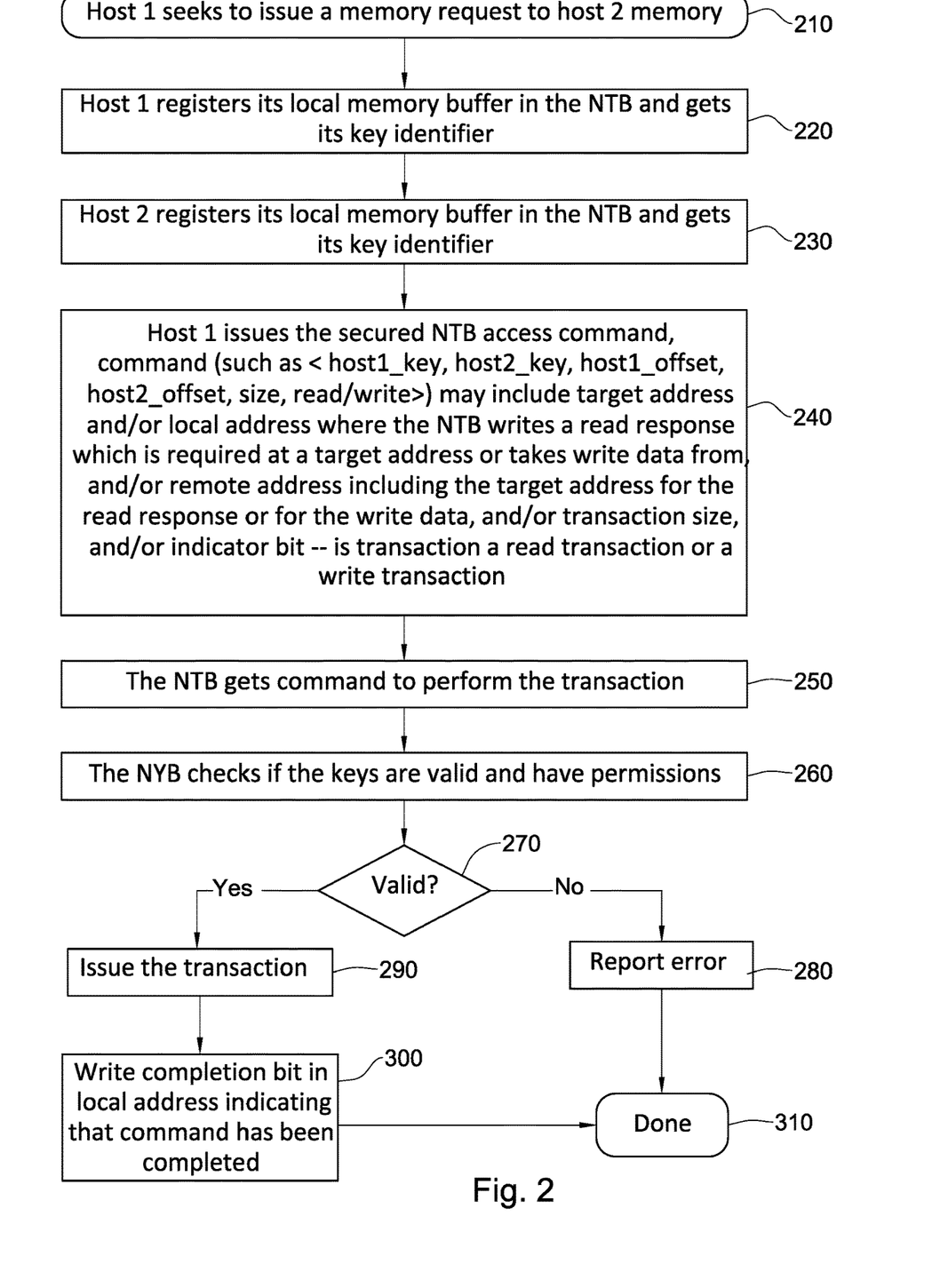
FIG. 2 is a simplified flowchart illustration of a method providing non-privileged Non-Transparent Bridge control and IO, whereby plural processes in a host, e.g., DPU host, may asynchronously access various parts of a main host's memory, with various granularities, all in accordance with an embodiment of the invention; all or any suitable subset of the illustrated operations may be performed, either stand-alone or in conjunction with all or any suitable subset of the blocks shown in FIG. 1. The method may be performed each time a first host issues a memory request to a second host's memory, via a bridge such as an NTB.

The apparatus of FIG. 1 typically provides non-privileged Non-Transparent Bridge control and IO, whereby plural processes in a host, e.g., DPU host, may asynchronously access various portions of a main host's memory, e.g., in accordance with the method of FIG. 2. Typically, no privileged process is required to control the NTB, since, instead, pre-registration is provided, in which key identifiers of memory region/s may be registered, and thereafter, NTB control can be provided by at least one (typically any) process which has, previously, registered a key identifier of a given memory region which is being used (accessed from the local host by another host via the NTB, for example) in a given transaction or IO session between the 2 hosts.

The first host is, in some embodiments, external to the API (Application Programming Interface) apparatus, but in other embodiments the first host could be comprised therein. Similarly, the second host is, in some embodiments, external to the API (Application Programming Interface) apparatus, but in other embodiments the second host could be comprised therein. The bridge chip is, in some embodiments, external to the API (Application Programming Interface) apparatus, but in other embodiments the bridge chip could be comprised therein.

The apparatus of FIG. 1 typically includes 2 APIs, on both sides of the bridge chip e.g., NTB; each API belongs to different address space since the first API belongs to host1's address space, and the second API belongs to the host2 address space. According to certain embodiments, the hosts are connected to busses on either side of the NTB, and, when one of the host's CPU uses the API, that host can, typically, access the other host's memory, via the bridge chip e.g., NTB. The non-transparent bridge or NTB may have, but does not necessarily have, scratchpad registers and/or doorbell registers and/or heartbeat messages. The NTB device API may be via PCIe or any other suitable standard for device connectors, and the transactions between the 2 hosts may or may not be PCIe transactions.

The second host may comprise a DPU e.g., a Bluefield®2 DPU in which case the second host includes ARM processors and the DPU host may also be termed "the ARM side" or "DPU side\host" of the bridge, as opposed to the other side of the bridge, which may be termed the "x86 side" (assuming the first or main host includes a x86 processor, as most do), or "main host side", of the bridge.

In FIG. 1, dotted vs. dashed lines are used to differentiate between commands on the 2 sides of the bridge respectively.

The NTB is typically symmetric in that each NTB API generates a READ/WRITE to both hosts.

It is appreciated that DPU's can gain non-privileged random accesses to host memory from the ARM side in an asynchronous way, e.g., via RDMA. However, the API shown and described in FIG. 1 may be a less complex solution; for example, creation of a valid RDMA connection for usage may include various commands and/or data structures which need not be provided when using the API shown and described herein.

FIG. 2 is a method, which may be performed by the system of FIG. 1 and which provides non-privileged Non-Transparent Bridge control and IO, whereby plural processes in a host, e.g., DPU host, may asynchronously access various portions of a main host's memory, with various granularities. It is appreciated that the flow is typically asynchronous because the NTB is responsible for performing all the transactions, in contrast to legacy NTB architectures in which the process itself (not the bridge) performs read/write transactions.

The method of FIG. 2 may be performed each time a process on a first host, host1, seeks to access a memory of a process on a second host, host2. Alternatively, or in addition, processes on host 2 may seek to access a memory of a process on the second host.

FIG. 2 may include all or any suitable subset of the following operations or those shown in FIG. 2, suitably ordered e.g., as shown or as follows:

Operation 210: host1 (or a process thereon) has a memory request to be issued to host2 memory (e.g., to write data of given size into host2 memory, or to read data of given size from host2 memory). Typically, host1 comprises the DPU host shown in FIG. 1, and host2 comprises the main host (e.g., x86) shown in FIG. 1. However, this is not intended to be limiting, since other alternatives are also possible. For example, the host2 may comprise the DPU host shown in FIG. 1, and host1 may comprises the main host. Host1 could be either a compute host or a storage host, and the same is true of host2.

Host1 may make any suitable use of the memory subject of host1's memory request, if host1's memory request is granted. Example use-case: host1 may be a DPU to which host2 offloaded some process, e.g., in order to use the DPU as an accelerator. However, as a result, the offloaded process may have to access host2 memory (e.g., a database which host2 uses), thus in this use-case, host1 (e.g., the process offloaded thereto) may need access to host2 memory. Also, certain devices may be connected to a DPU and may not be connected directly to a host such as BlueField®-2× SSDs. If host1's request is granted, this could then enable the device to access the host memory and/or could enable the host (e.g., the main host) to access DPU device buffer/s. It is appreciated that the above are but examples of the many use-cases in which a DPU may need non-privileged random accesses to host memory from the ARM side, e.g., in an asynchronous way.

According to certain embodiments, each process has a command gateway at its disposal (one gateway per process) e.g., as described herein.

Assume that in Operation 210, a "process 1" on host1 seeks to issue the memory request to the memory of "process 2" on host2. Subsequently, the following operations may follow:

Operation 220: process 1 on host1 registers its local memory buffer in the NTB and gets its key identifier (typically using the NTB API of FIG. 1).

Operation 230: process 2 on host2 registers its local memory buffer in the NTB and gets its key identifier (typically using the NTB API of FIG. 1).

Typically, host2 gives host 1 the host2 key identifier typically through a method which is external to the NTB API. Any suitable technology may be employed for exchanging key identifiers, such as, by way of non-limiting example, via network connection (e.g., TCP), via a shared file from which both hosts can read and/or to which both hosts can write, or even by manual copying.

It is appreciated that if the memory buffer being used is already registered, Operation 220 is typically omitted. Also, if the memory buffer being used is already registered, Operation 230 is typically omitted.

Operation 240: process 1 on host1 issues the secured NTB access command (which may include all or any suitable subset of: <host1_key, host2_key, host1_offset, host2_offset, size, read/write>). This command may, generally, include a local address where the NTB writes a read response which is required at a target address, or takes write data from, and/or a remote address serving as a target address for the read response or for the write data, and/or transaction size, and/or indicator bit stipulating whether the transaction is a read transaction or a write transaction (typically using the NTB API of FIG. 1).

It is appreciated that operation 240 onward can be done multiple times (depending on the number of accesses host1 needs to perform).

Operation 250: The NTB gets a command to perform the transaction

Operation 260: The NTB checks if the keys are valid and have permissions

Operation 270: Determination of validity e.g., yes/no

Operation 280: Report error

Operation 290: Issue the transaction

Operation 300: Increment a command counter, or write a completion bit indicating that command has been completed, e.g., in local address which may be in host1's own local memory. The term "completion bit" is intended to include a bit whose value indicates whether or not a certain transaction has issued and is completed. Since, when the bridge chip finishes a transaction, a "completion" bit is flipped (e.g., if the bit is 0, the bridge chip writes 1, or if the bit is 1, the NTB writes 0), and at least one (typically any) process can determine whether or not a transaction has been completed by tracking the completion bit's value. However, it is appreciated that implementation via a command counter or completion bit are described herein merely by way of non-limiting example. Alternatively, any other appropriate method to track when a transaction has finished or been completed, may be used.

Typically, the command counter is physically stored on an internal memory of the NTB. The command counter may, logically, form part of the address space range indicated by the BAR of the NTB.

Operation 310: Done.

According to certain embodiments, each time a process in host1 wants to issue a memory request to a portion of host2's memory, the flow of FIG. 2 is performed. If for example, the method of FIG. 2 is performed n times by n processes in host1, where the n processes each seek to issue a memory request to a respective portion of host2's memory, each of the n processes typically gains asynchronous access to the corresponding portion of host2's memory.

Any suitable action may be taken or not taken, responsive to an error having been reported in operation 280. Typically, whichsoever entity e.g., process in host1 commanded the NTB to perform the transaction, is the entity which gets the error report. One action that may be taken, is for the entity e.g., process in host1 to issue a command to perform a valid transaction, if an error has been reported indicating that a command previously issued by that entity, was not valid. For example, if the length field of a command issued by the process is greater than the size of the memory region—the NTB may fail the command, but no fatal error state is entered; instead, the method, after operation 280, returns to operation 250, and the process which issued the failed or invalid command may issue another command to use a valid transaction, in which case no error would be reported in operation 80, and the transaction may issue (operation 290). "Fatal" error states, if any, may be defined using any suitable criterion e.g., may be a result of an internal NTB HW implementation. For example, the NTB HW implementation may create scenarios of fatal errors.

It is appreciated that incrementation of a command counter or flipping a completion bit are 2 possible methods, mentioned by way of non-limiting example, for indicating to the process which issued the command, that the asynchronous transaction, subject of operation 280, has been completed.

According to certain embodiments, memory isolation is achieved, since only a process A which has a given key identifier can access a given memory, whereas at least one (typically any) process which does not have the given key identifier cannot access the given memory. Thus, the given memory is isolated from all processes A.

The NTB API may be characterized by a command structure which includes all or any suitable subset of the following command structure components: <local key, remote key, local offset, remote offset, transaction size e.g., in bytes, and a binary read\write bit>. The local and/or remote keys typically each uniquely identify a memory address range or memory region which the NTB can access; this allows security and/or isolation to be enforced. Typically, certain portions of each memory region or range e.g., the first few bytes (say, 4) of the memory region are reserved for NTB use, e.g., for provision of command gateways as described herein. The stored local/remote offset may indicate an offset from the start of the memory space identified, typically uniquely, by the key. The read/write bit indicates whether a given transaction is a read operation or a write operation.

The NTB API command/s may be written, by at least one process, to a "command gateway" assigned thereto, typically uniquely, i.e., the command gateway is typically assigned to a given process, and to no other process. The NTB may then start processing the command and a new command may be written to the gateway. Typically, each command gateway has a corresponding "command counter" which increments upon command completion; the command gateway and its command counter typically require no more than a few bytes of storage.

Multi-Host Environment

The API of the NTB may include a command in the following format:

<local address, remote address, size, read\write>

"local address" is the space to which the bridge chip may write the read response or from which the bridge chip may take the write data; the remote address is also termed the "target" address in the host memory, and size is the size of the transaction in bytes and read\write is the transaction type.

Each time a process seeks to issue a read from the host memory in address X for S bytes and seeks to store the result in the process's address Y—the process may issue the command: <Y, X, S, read>.

The command for write transaction may be analogous e.g., each time a process seeks to issue a write of S bytes to the host memory at address X, and the S bytes are currently in the process's address Y—the process may issue the command: <Y, X, S, write>. After issuing this command, the process does not need to wait, since the NTB will handle the command asynchronously. The NTB typically notifies the process of command completion by incrementing a command counter which corresponds to a command gateway via which this command was issued, or by storing a completion bit in a local address which may reside, say, in the first byte of the local address. The process may then proceed accordingly, e.g., the program may, depending on its own logic, take some action and/or refrain from taking some action, responsive to being notified of command completion. For example, if a process in a host on one side of a bridge is configured to read data from another host on the other side of the bridge, the process may begin using the data only upon receipt of notification of command completion. In contrast, it is appreciated that a conventional computer process typically needs to wait to get memory, since a conventional NTB uses conventional PCIe transactions which generate a response only after a certain time has elapsed; this is not the case for the embodiments herein.

To allow multiple processes to access the NTB concurrently, each process may be given at least one "command gateway", where that process may write its commands. It is appreciated that plural command gateways may be assigned to a single process, however, to ensure isolation, plural processes typically are not assigned to a single command gateway.

Since each process's command gateway/s need be only a few bytes in size, e.g., as long as the length of the command itself, up to thousands of processes may be supported at the "cost" of but a few KB of BAR which may be devoted to a command gateway.

The KB devoted to the command gateway may comprise a suitable memory address space or memory region which may be pointed to by the Base Address Register (BAR) and which typically is but a few KBs in size, sufficient to include the addresses of the command gateway. The KB devoted to the command gateway may be part of the device BAR address space (which may or may not be resizable), thus may simply be memory addresses the device exposes to hosts, and may not be connected to any actual memory. The NTB may have an internal queue which monitors the commands written to the gateway aka GW (or may monitor the commands using any other suitable method or data structure). The NTB typically cannot distinguish between different processes, and, instead, simply enables a process to use the NTB if and only if that process has the right key. Thus typically, the NTB need not know how many commands are in the gateway, nor which command belongs to which process.

It is appreciated that even a conventional NTB may be configured to transfer a transaction (e.g., read or write) between two hosts. The command gateway provided in accordance with certain embodiments serves as an interface for commanding the NTB to transfer a transaction (read or write) between two hosts. Typically, key identifiers, e.g., as described herein, indicate to the NTB which memory region to operate on, and/or the size of the data to be read/write, and/or a read/write bit indicates to the NTB which type of transaction to issue.

To support permissions and/or isolation, key identifiers may be employed. The secured command format may, for example, include all or any suitable subset of the following format components:

<local key, remote key, local offset, remote offset, size, read/write> where local/remote key is an identifier, typically unique, for a local/remote memory address range respectively, which the NTB can access, local/remote offset is the offset from the start of the local/remote memory space respectively, and the remaining parameters (size, read/write) characterize the transaction which the process seeks to issue by respectively indicating the amount of data to be read/written, and whether the transaction is a read-type or write-type transaction.

Typically, the key identifier is required to be pre-registered by the relevant process with all relevant permissions, to ensure that only a process which owns a previously registered key identifier, uniquely (typically) identifying a given region in memory, may access the given region.

Typically, the keys are not one-time keys. A key identifier is typically registered once, and may then, from that point onward, be used repeatedly by the NTB (e.g., unless and until unregistered explicitly). Thus, typically, even given a memory region which is to be used (read from and/or written to) multiple times using a given key, a single registration of that key identifier is sufficient, assuming indeed that the same key is used for all the various uses of the memory region. Any suitable method may be used to register the memory such as, by way of non-limiting example, conventional memory registration methods known in InfiniBand technology e.g., as described in the following https www link: rdmamojo.com/2012/09/07/ibv_reg_mr/.

It is appreciated that each process registers its key identifier, and, typically, such pre-registration occurs each time a memory region needs to be accessed by the NTB, because use of the NTB with the memory region typically requires that the memory region be registered, and that the key identifier which, typically uniquely, identifies the registered memory region be provided as a condition for accessing that region. The entity responsible for registering a specific memory region is typically the process which owns this memory region.

It is appreciated that in conventional use of NTB to share memory between 2 hosts, the NTB may create a region on its own address space which points to the memory region of the host.

If Host A wants to write to Host B, then all or any suitable subset of the following operations may be performed:

Operation 1a: Host A may configure the NTB window to point to the desired memory Operation 1b: Host A may notify Host B that Host B may write Operation 1c: Host B may write its actual data to the NTB address space.

The NTB may forward this write to the memory that the NTB window points to (to the Host A memory). Typically, this window allocation on the NTB address space limits the size and/or amount of memory which can be spanned using a single NTB. Alternatively, however, an NTB provided according to embodiments of the present invention, does not include the above type of window—and instead copies from a region on Host A to a region on Host B (or vice versa). For example (using the above example), if Host A wants to write to Host B, then all or any suitable subset of the following operations may be performed:

Operation 2a: Host A may register a memory region with write permission

Operation 2b: Host B may register a memory region with read permission

Operation 2c: Host A may notify Host B about the Host A key

Operation 2d: Host B may write its data to its registered region

Operation 2e: Host B may write a command which commands the NTB to copy from Host B memory pointed by Host B key to Host A memory pointed by Host A key.

Thus typically, Host B does not write the actual data because the command typically does not include the actual data. It is appreciated that, typically, Host B needs the Host A key to proceed, which prevents other processes on Host B from gaining access to memory. Typically, a NTB command is valid if and only if it includes both keys—a local key and a remote key.

It is appreciated that embodiments herein have many advantages in practice, such as, by way of non-limiting example, the following: processes in a first host accessing the other host memory may be non-privileged. Security and isolation between processes is maintained. Multiple processes are supported. Asynchronous access to host memory, typically with more than one level of granularity, is supported. It is appreciated that granularity may define a relationship e.g., a ratio between amounts of computation and of communication. If parallelism is fine-grained, task code sizes and execution times are small, and small amounts of data (e.g., a few memory words or less) is communicated between processors frequently. Conversely, if parallelism is coarse-grained, task code sizes and execution times are large, and the amounts of data transferred among processors are also large and are transferred among processors infrequently. Thus, granularity defines how frequently data is communicated, and with which amount (large or small) of computation. It is appreciated that determination of granularity typically is subject to the following tradeoff: fine granularity increases parallelism and speed, but also increases overheads of synchronization and communication. Conversely, coarse granularity decreases parallelism and speed, but also decreases overheads of synchronization and communication.

According to certain embodiments, use of the system of FIG. 1 and/or of the method of FIG. 2 allows multiple processes in a host, e.g., DPU host, to asynchronously access different parts of a main host's memory, with various granularities.

Example 1: Consider a single offloaded process with a single granularity e.g., table entry size. This offloaded process may need to access a few entries in a table in main host memory. The table size is huge (e.g., tens of GB) whereas each entry therewithin is small (e.g., a few bytes each). The table cannot, due to its large size, be mapped all at once through legacy NTB, so accessing to the first entry and to the last would require costly re-configuring of the legacy NTB. In contrast, the API described herein, e.g., via the embodiments of FIG. 1 and/or FIG. 2, allows this access to take place with just one registration (of just one local memory buffer in the NTB, for example).

It is appreciated that use of the embodiment of FIG. 2 in the above Example 1 typically reduces communication overhead and/or prevents load imbalance, where load indicates the number of processes which use the NTB and how NTB resources are allocated to each.

Still with reference to Example 1, it is appreciated that on legacy NTB, each window reconfiguration requires notifying the other host. Thus, accessing an entry on the table which is not mapped requires reconfiguring the window and letting the other host know about the window reconfiguration. In contrast, when using the API shown and described herein (e.g., when using the embodiment of FIG. 2), the entire table is mapped all at once.

It is appreciated that load imbalance would result if, say, process A only requires accessing a few table entries, but maps the entire table. In this situation, only one mapping is required, and the mapping is coarse since it includes considerable unused table entries/regions. In contrast, if the window only includes the memory needed each time, the window typically needs to be configured on each access, thus each window configuration typically requires communication to inform the other host about the window reconfiguration.

It is appreciated that references herein to memory regions may be interchanged with references to buffers, and vice versa.

Example 2: The offloaded process needs to access big data residing on the main host. If legacy NTB were to be used, the big data may all be mapped, however, using that big data would require the process to transfer or read this big data itself from the window, which would require the process to use its own resources for accessing the big data. In contrast, if the API described herein, e.g., as per the embodiments of FIG. 1 and/or FIG. 2, is employed, the NTB does the transactions and copies the transaction results to whichever memory buffer was registered, thereby freeing the offloaded process's resources for other tasks. It is appreciated that embodiments herein improve parallel performance, by enabling a better balance between load and communication overhead. Due to the fact that varying granularity is supported, performance is no longer strictly subject to the above tradeoff. Instead, according to certain embodiments, the eventuality of too fine granularity, in which performance suffers from communication overhead, may be reduced or eliminated, and the eventuality of too coarse granularity, in which performance suffers from load imbalance, may also be reduced or eliminated.

It is appreciated that in Example 2, the CPU is used less (is used more parsimoniously) since the copying is performed by the NTB, rather than by the CPU.

DPU use-cases, for example, may require, or benefit from, or be improved by, non-privileged random accesses to host memory from the ARM side, which are asynchronous.

Figure 3A:
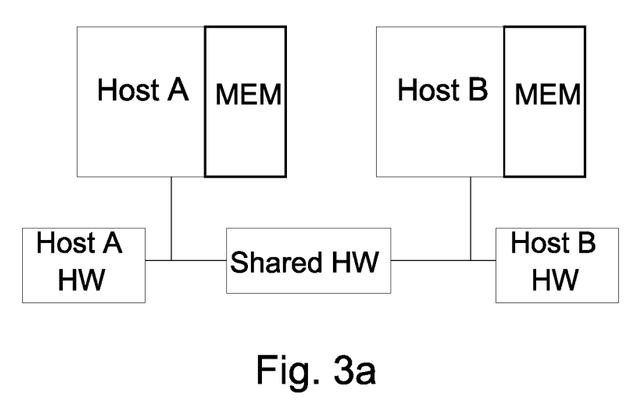
FIGS. 3a-3b are simplified block diagrams of multi-host environments in which embodiments herein may be implemented.
Figure 3B:
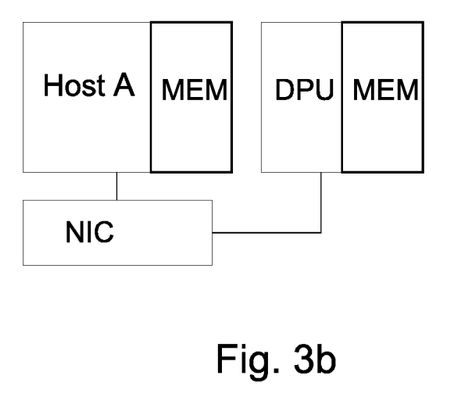

FIGS. 3a-3b show examples of multi-host environments in which embodiments herein may be implemented; as shown, each host is associated with a memory (aka MEM). The term "all" is used herein for simplicity, to describe example embodiments. It is appreciated however that, alternatively, whatever is said herein to be true of, or to characterize or to pertain to, "all" members of, or "each" member of, or "every" member of, a certain set can also, in other embodiments, be true of, or characterize or pertain to, most but not all members of that set, or all but a few members of that set, or at least one (but less than all) member/s of the set.

It is appreciated that software components of the present invention may, if desired, be implemented in ROM (read only memory) form. The software components may, generally, be implemented in firmware or hardware, if desired, using conventional techniques. It is further appreciated that the software components may be instantiated, for example as a computer program product, or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments, may also be provided in combination in a single embodiment. Conversely, various features of the invention which are, for brevity, described in the context of a single embodiment, may also be provided separately, or in any suitable sub-combination.

It will be appreciated by persons skilled in the art that the present invention is not limited by what has been particularly shown and described hereinabove. Rather, the scope of the invention includes, inter alia, the appended claims and equivalents thereof.

The invention claimed is:

1. An apparatus that implements an API (application programming interface) that is operative in conjunction with a bridge chip, a first host and a second host, wherein the first and second hosts have first and second memories, respectively, and wherein the bridge chip connects the first and second memories, the apparatus comprising:
   a processor that provides:
      key identifier registration functionality to register a key identifier for each of plural computer processes performed by the first host, thereby to define plural key identifiers;
      access control functionality to provide at least one computer process P1 performed by the first host with access, via the bridge chip, to at least one local memory buffer M2 residing in the second memory after the access control functionality first validates that said at least one computer process P1 has a key identifier which has been registered via the key identifier registration functionality, and wherein the access control functionality also prevents at least one computer process P2, which is performed by the first host and which has not registered a key identifier via the key identifier registration functionality, from accessing the at least one local memory buffer M2 via the bridge chip,
      an additional key identifier registration functionality; and
      an additional access control functionality, which provides at least one computer process P3 performed by the second host with access via the bridge chip to at least one local memory buffer M1 residing in the first memory after the additional access control functionality first validates that said at least one computer process P3 has a key identifier which has been registered via the additional key identifier registration functionality, and wherein the additional access control functionality also prevents at least one computer process P4, which is performed by the second host and which has not registered a key identifier via the additional key identifier registration functionality, from accessing the at least one local memory buffer M1 via the bridge chip.

2. The apparatus according to claim 1, wherein the first host registers said at least one local memory buffer M1 in the bridge chip and, responsively, receives a key identifier from the bridge chip.

3. The apparatus according to claim 1, wherein the second host registers said at least one local memory buffer M2 in the bridge chip and, responsively, receives a key identifier from the bridge chip.

4. The apparatus according to claim 1, wherein at least one command to perform a read transaction is issued by the first host and wherein the at least one command comprises a target address and a local address where the bridge chip writes a read response which is required at the target address.

5. The apparatus according to claim 4, wherein the at least one command also comprises a transaction size parameter indicative of an amount of data to be read.

6. The apparatus according to claim 4, wherein the bridge chip receives said at least one command via the API and makes a validation attempt including attempting to validate that said at least one command has a valid key from said first host and a valid key from said second host and wherein the read transaction is performed only after the bridge chip succeeds in said validation attempt.

7. The apparatus according to claim 6, wherein an error message is generated each time the bridge chip determines that the first host does not have a key identifier registered via the key identifier registration functionality.

8. The apparatus according to claim 4, and wherein, to indicate that the read transaction has been performed, a command counter is incremented.

9. The apparatus according to claim 4, wherein a completion bit is provided to indicate that the read transaction has been performed.

10. The apparatus according to claim 1, wherein at least one command to perform a write transaction is issued by the first host and wherein the at least one command comprises a target address and a local address from which the bridge chip takes write data.

11. The apparatus according to claim 10, wherein the at least one command also comprises a transaction size parameter indicative of an amount of data to be written.

12. The apparatus according to claim 10, wherein the bridge chip receives said at least one command via the API and, responsively, makes a validation attempt including attempting to validate that said at least one command has a valid key from said first host and a valid key from said second host, and wherein the write transaction is performed only after the bridge chip succeeds in said validation attempt.

13. The apparatus according to claim 10, wherein, to indicate that the write transaction has been performed, a command counter is incremented.

14. The apparatus according to claim 10, and wherein a completion bit is provided to indicate that the write transaction has been performed.

15. The apparatus according to claim 1, wherein the bridge chip comprises a Non-Transparent Bridge (NTB) which connects plural memories residing on plural computers, respectively, to a single PCI-Express fabric.

16. The apparatus according to claim 1, wherein the second host includes a smart Network Interface Card (NIC).

17. The apparatus according to claim 16, wherein the second host comprises a Data Processing Unit (DPU).

18. The apparatus according to claim 1, which provides an interface to the bridge chip and provides memory isolation between at least one computer process A performed by the first host and the at least one local memory buffer M2.

19. The apparatus according to claim 1, wherein the further comprising includes the bridge chip, the first host, and the second host.

20. The apparatus according to claim 1, wherein the key identifier identifies the at least one local memory buffer M2.

21. The apparatus according to claim 1, wherein the key identifier uniquely identifies the at least one local memory buffer M2.

22. An application programming interfacing (API) method operative in conjunction with a bridge chip, a first host and a second host, wherein the first and second hosts have first and second memories, respectively, and wherein the bridge chip connects the first and second memories, the method comprising:
registering a key identifier for each of plural computer processes performed by the first host, thereby to define plural key identifiers;
providing at least one computer process P1 performed by the first host with access via the bridge chip to at least one local memory buffer M2 residing in the second memory after first validating that said at least one computer process P1 has a key identifier which has been registered;
preventing at least one computer process P2, which is performed by the first host and which has not registered a key identifier, from accessing the at least one local memory buffer M2 via the bridge chip;
providing at least one computer process P3 performed by the second host with access via the bridge chip to at least one local memory buffer M1 residing in the first memory after first validating that said at least one computer process P3 has a key identifier which has been registered; and
preventing at least one computer process P4, which is performed by the second host and which has not registered a key identifier via the additional key identifier registration functionality, from accessing the at least one local memory buffer M1 via the bridge chip.

* * * * *